United States Patent
Schmitz et al.

(10) Patent No.: US 10,393,273 B2
(45) Date of Patent: Aug. 27, 2019

(54) ADJUSTMENT ELEMENT FOR AN OVERRUN AIR RECIRCULATION VALVE

(71) Applicant: PIERBURG GMBH, Neuss (DE)

(72) Inventors: Helmut Schmitz, Rommerskirchen (DE); Martin Lenk, Neuss (DE); Oliver Paul, Gelsenkirchen (DE); Daniel Mandjeralo, Duesseldorf (DE)

(73) Assignee: PIERBURG GMBH, Neuss (DE)

( * ) Notice: Subject to any disclaimer, the term of this patent is extended or adjusted under 35 U.S.C. 154(b) by 66 days.

(21) Appl. No.: 15/511,646

(22) PCT Filed: Jul. 17, 2015

(86) PCT No.: PCT/EP2015/066453
§ 371 (c)(1),
(2) Date: Mar. 16, 2017

(87) PCT Pub. No.: WO2016/041659
PCT Pub. Date: Mar. 24, 2016

(65) Prior Publication Data
US 2017/0292615 A1 Oct. 12, 2017

(30) Foreign Application Priority Data
Sep. 19, 2014 (DE) .......................... 10 2014 113 550

(51) Int. Cl.
*F16K 1/36* (2006.01)
*F02B 37/16* (2006.01)
(Continued)

(52) U.S. Cl.
CPC ................ *F16K 1/36* (2013.01); *F02B 37/16* (2013.01); *F16K 31/0655* (2013.01); *H01F 7/1607* (2013.01); *Y02T 10/144* (2013.01)

(58) Field of Classification Search
CPC ............................... H01F 7/1607; F02B 37/16
(Continued)

(56) References Cited

U.S. PATENT DOCUMENTS 2,990,155 A * 6/1961 Selinder ................ F16K 31/408
251/30.03
3,253,608 A * 5/1966 Davis ...................... F16K 1/123
137/220
(Continued)

FOREIGN PATENT DOCUMENTS

CN 103717430 A 4/2014
DE 100 20 041 A1 10/2001
(Continued)

*Primary Examiner* — Eric Keasel
(74) *Attorney, Agent, or Firm* — Norman B. Thot

(57) ABSTRACT

An adjustment element for a divert-air valve. The adjustment element includes an actuation element which moves translatorily, and a control body which moves with the actuation element. The control body includes a first hollow body and a second hollow body. The first hollow body includes an outer surface which is circumferentially closed so as to define an interior, a first axial end, and an annular plate which extends radially inward from the first axial end. The second hollow body includes a radially outer annular plate which is sealingly fastened in an encircling manner axially to the annular plate of the first hollow body, and a radially inner region in which an outer surface extends in a direction of the actuation element in the interior of the first hollow body.

13 Claims, 2 Drawing Sheets

(51) Int. Cl.
*H01F 7/16* (2006.01)
*F16K 31/06* (2006.01)

(58) Field of Classification Search
USPC .................................. 251/129.07, 129.15
See application file for complete search history.

(56) References Cited

U.S. PATENT DOCUMENTS

| | | | | |
|---|---|---|---|---|
| 3,994,318 | A | * | 11/1976 | Ishigaki ................ F16K 31/404 |
| | | | | 137/630.14 |
| 4,355,606 | A | * | 10/1982 | Casey ................... F02D 31/005 |
| | | | | 123/339.25 |
| 4,411,406 | A | * | 10/1983 | Inada ................... F16K 31/0693 |
| | | | | 251/129.07 |
| 5,526,837 | A | | 6/1996 | Eaker |
| 5,791,630 | A | * | 8/1998 | Nakao ................... F02M 23/006 |
| | | | | 251/129.15 |
| 7,757,873 | B2 | * | 7/2010 | Thiery ................. F02B 29/0418 |
| | | | | 251/129.07 |
| 2013/0019844 | A1 | | 1/2013 | Kulkarni et al. |
| 2013/0313455 | A1 | | 11/2013 | Bittner |
| 2016/0195005 | A1 | | 7/2016 | Bonanno |

FOREIGN PATENT DOCUMENTS

| | | |
|---|---|---|
| DE | 10 2004 044 439 B4 | 9/2006 |
| DE | 10 2010 026 121 A1 | 1/2012 |
| DE | 10 2012 224 130 B3 | 6/2014 |
| FR | 2.179.310 A5 | 11/1973 |
| GB | 470535 A | 8/1937 |
| GB | 1 429 493 A | 3/1976 |
| JP | 2001-355453 A | 12/2001 |
| JP | 2013-83339 A | 5/2013 |
| JP | 2014-47800 A | 3/2014 |
| WO | WO 96/17193 A1 | 6/1996 |
| WO | WO 2006/029814 A1 | 3/2006 |
| WO | WO 2014/102133 A1 | 7/2014 |

* cited by examiner

ADJUSTMENT ELEMENT FOR AN OVERRUN AIR RECIRCULATION VALVE

CROSS REFERENCE TO PRIOR APPLICATIONS

This application is a U.S. National Phase application under 35 U.S.C. § 371 of International Application No. PCT/EP2015/066453, filed on Jul. 17, 2015 and which claims benefit to German Patent Application No. 10 2014 113 550.4, filed on Sep. 19, 2014. The International Application was published in German on Mar. 24, 2016 as WO 2016/041659 A1 under PCT Article 21(2).

FIELD

The present invention relates to an adjustment element for a divert-air valve comprising an actuation element which is movable in a translatory manner and a control body which is movable with the actuation element.

BACKGROUND

Divert-air valves for recirculation of condensed fresh gas, optionally with recirculated exhaust gas, from the pressure side of a compressor of a turbocharger back to the suction side of the compressor, have previously been described. The connection between the pressure side and the suction side of the compressor via a bypass line is required for the transition from a high load into the coasting operation of the internal combustion engine to prevent a high conveyance of the booster pump against a closed throttle flap, to prevent the resultant pumping effect, and to prevent a sudden drop of the turbo speed which is too strong with resulting thermodynamic problems.

Divert-air valves are frequently operated electromagnetically with the valve closure body of the valve being moved via the armature by an electromagnetic force. An example of such an arrangement is described in DE 100 20 041 A1. Control is performed via a control unit in accordance with correspondingly existing motor data. The valve comprises a pressure compensation opening on the valve closure body whereby a balance of forces is established for the pneumatic forces with a corresponding design of the effective surfaces. The closure body in this valve is connected directly to the armature, and the interior of the valve is separated from the outer region via a membrane. A bore is formed in the armature and the closure body via which a pressure compensation is established between the pressure side of the turbo charger and the interior of the valve.

A valve was normally omitted in subsequent generations of divert-air valves. A substantially cylindrical control body was used which was connected in a gimbaled manner to the armature, and which in the radially outer region was sealed by a sealing ring instead a membrane. Such a divert-air valve is described, for example, in DE 10 2010 026 121 A1. The substantially cylindrical control body comprises, at its end facing toward the armature, a constriction which has a widened portion of a sliding sleeve gripping behind it which is connected to the armature so that the armature together with the sliding sleeve and the control body will be lifted off or lowered onto the valve seat.

Other publications, such as WO 2014/102133 A1 or DE 10 2004 044 439 B4, describe a constriction directly at the armature followed by a widened portion so that the control body, after having been inserted via the widened portion, will grip into the constriction and thus be fastened in a form-locking manner. The control body must be provided with radially inward facing, resilient elements therefor. The control body therefor is normally produced as a plastic part which, however, only has limited thermal resistance.

The ends of these control bodies which face toward the valve seat consist of the axial ends of their cylindrical outer surface. These arrangements therefore have the disadvantage that new shapes for the control bodies must be designed in each case for turbo chargers generating different pressures, while the diameters of these shapes must be adapted to the cross sections that are to be sealed. These arrangements are further often not suited for increased operating temperatures due to the plastic material used. Problems also occur via closing and opening movements which are too noisy. Problems may in particular occur with respect to sealing tightness.

SUMMARY

An aspect of the present invention is to provide an adjustment element for a divert-air valve that will open and close with only a minimum amount of noise, which is inexpensive to produce, which is thermally resistant, and which has a high leak tightness. A further aspect of the present invention is to provide an adjustment element for a divert-air valve where production costs are reduced by providing an adaptation to different cross sections that are to be sealed.

In an embodiment, the present invention provides an adjustment element for a divert-air valve. The adjustment element includes an actuation element configured to move translatorily, and a control body configured to move with the actuation element. The control body comprises a first hollow body and a second hollow body. The first hollow body comprises an outer surface which is circumferentially closed so as to define an interior, a first axial end, and an annular plate which is configured to extend radially inward from the first axial end. The second hollow body comprises a radially outer annular plate which is configured to be sealingly fastened in an encircling manner axially to the annular plate of the first hollow body, and a radially inner region in which an outer surface extends in a direction of the actuation element in the interior of the first hollow body.

BRIEF DESCRIPTION OF THE DRAWINGS

The present invention is described in greater detail below on the basis of embodiments and of the drawings in which.

DETAILED DESCRIPTION

Figure 1:
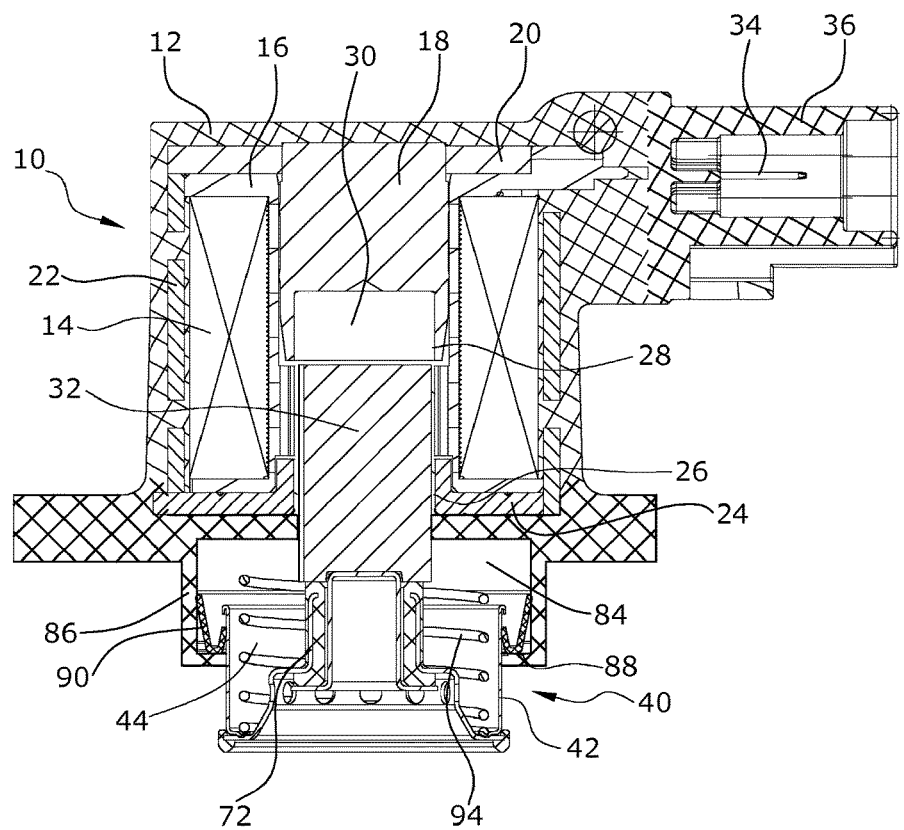
FIG. 1 shows a sectional lateral view of a divert-air valve comprising an adjustment element according to the present invention.
Figure 2:
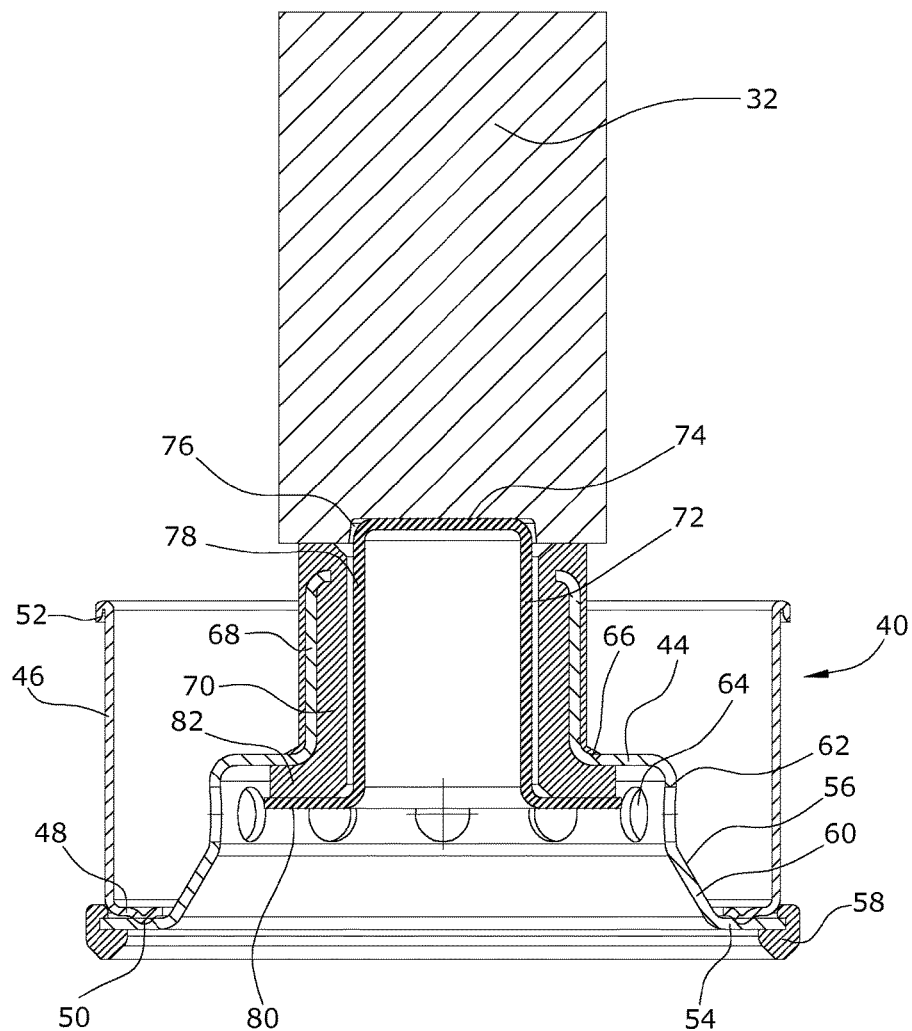
FIG. 2 shows a sectional lateral view of the adjustment element according to the present invention.

The control body can be adapted with respect to its shut-off cross section in a simple manner since the control body comprises a first hollow body having a circumferentially closed outer surface from the first axial end of which an annular plate extends radially inward, and a second hollow body having a radially outer annular plate which is sealingly fastened in an encircling manner axially to the annular plate of the first hollow body and from the radially inner region of which an outer surface extends in the direction of the actuation element in the interior of the first hollow body. The adjustment element can be produced in a simple and cost-effective manner via the simple shape of the individual component parts, and it is possible to choose thermally resistant materials such as, for example, sheet metal. Sealing tightness between the components can also be safeguarded.

In an embodiment of the present invention, the outer surface of the first hollow body can, for example, be cylindrical. Such a shape can be produced in a particularly simple manner, and sealing tightness on the outer circumference is safeguarded through the entire stroke range.

In a modification of the above embodiment, the outer surface of the first hollow body can, for example, be designed with a conically widening shape in the direction toward the actuation element. Tight closure is thereby safeguarded in the closed state of the valve while wear of the surrounding sealing is minimized during stroke movement.

It can be advantageous for at least one opening to be formed in the outer surface of the second hollow body via which the pressure compensation between the bottom side of the adjustment element and the interior of the valve can be established in a simple manner.

In an embodiment of the present invention, the control body can, for example, be fixedly connected to the actuation element. This can be realized either directly or via intermediate components. Each case provides a direct movement coupling between the actuation element, which is normally designed as an armature, and the control body.

In an embodiment of the present invention, the actuation element can, for example, have a connection element fastened thereto which extends into the interior of the second hollow body and which, on its end facing away from the actuation element, comprises a radially widened portion, and the second hollow body comprising a corresponding radial constriction arranged axially between the actuation element and the radially widened portion of the connection element, wherein the outer circumference of the radially widened portion of the connection element is larger than the inner circumference of the radial constriction of the second hollow body. Fastening the control body on the actuation element is thereby realized in a simple manner, the fastening allowing for a tilting movement of the control body relative to the actuation element without the need for deforming any of the components during the fastening process.

In a modification of the above embodiment, the connection element can be fastened in a central recess on the actuation element, the diameter of the central recess corresponding to the outer diameter of the connection element in the region extending into the recess. The connection element thereby also serves to center the control body relative to the actuation element. This will facilitate the assembly process of the adjustment element.

In an embodiment of the present invention, an elastomer can, for example, be arranged between the connection element and the second hollow body, thus allowing for a dampened movement between the connection element and the control body. This makes an easy tilting of the control body possible and achieves a dampening of noise during movement.

In a modification of the above embodiment, the elastomer extends from the actuation element up to the radially widened portion of the connection element and fills a space that is located axially between the radially widened portion and the radial constriction of the second hollow body. The elastomer correspondingly has a damping effect both in an axial direction and in a radial direction and, if desired, can seal the space between the fastening element and the second hollow body. The elastomer can also be designed to comprise axial connections which are completely or partially distributed along the circumference in a uniform or non-uniform manner, the connections effecting a pressure compensation between the interior and the pressure chamber before the closure body.

For generating the pressure-balanced state of the adjustment element in the valve, the second hollow body is formed with a plurality of openings which are distributed along the circumference in a region between the radial constriction of the second hollow body and the annular plate of the second hollow body. These openings can be generated in a simple manner, for example, by punching. The openings present a sufficient through-flow cross section for fast pressure compensation in case of rapidly changing pressures.

It can be advantageous if, on the side of the annular plate of the second hollow body remote from the actuation element, a sealing ring is fastened whose diameter corresponds to the largest diameter of the first hollow body. This will effect a leak-tight closure upon placement on the valve seat and will lead to identical force application surfaces on the axially opposite sides of the adjustment element so that a balance of forces is generated which will require small adjustment forces and provides extremely short actuation times.

In an embodiment of the present invention, a spring can, for example, be arranged radially between the two hollow bodies which bears in an axially biased state onto the radially inward extending plate of the first hollow body. A return movement of the adjustment element to its position for closing the duct will thereby be safeguarded. This arrangement allows the spring to be installed in a particularly simple manner.

In an embodiment of the present invention, the two hollow bodies and the connection element can, for example, be produced as deep-drawn parts from sheet metal. The closure element can correspondingly be produced in a cost-effective manner while at the same time providing high strength, corrosion resistance, and thermal resistance.

In an embodiment of the present invention, the two hollow bodies can, for example, be fastened to each other and/or the connection element can be fastened to the actuation element by welding, bonding, flanging, or crimping. These connecting techniques can also be practiced in a cost-effective manner and provide a long connection lifespan.

An adjustment element for a divert-air valve is thus provided that provides high durability and leak-tightness and which can be produced in a cost-effective manner. Adaptation to other cross sections is also possible in a simple manner without the need to change shapes. This closure element can be switched with a low noise level and is thermally resistant.

An embodiment of a divert-air valve comprising a closure element according to the present invention is illustrated in the drawings and will be described below.

The divert-air valve shown in FIG. 1 comprises an electromagnetic actuator 10 in whose housing 12 a coil 14 is arranged on a coil carrier 16. A magnetizable core 18 is fastened in the radially inner region of coil carrier 16 whose axial end extends beyond coil carrier 16 wherein, on the axial end, the core 18 is surrounded by a return plate 20 which is arranged in connection with a yoke 22 surrounding the coil 14. A second plate 24 is arranged on the end of coil carrier 16 opposite core 18 which, in the radially outer region, is in contact with yoke 22 and which comprises an inner axial extension portion 26 extending into coil carrier 16. In the radial interior of this inner axial extension portion 26, a guide sleeve 28 is arranged which extends all the way until entering a central recess 30 of core 18 and in which an armature acting as an actuation element 32 is supported. The coil 14 can be supplied with power via conduits 34 entering a plug 36.

As soon as a sufficiently large current flows in core 18, a magnetic field is generated by which the actuation element 32 is adjusted in the direction of core 18.

Actuation element 32 thus serves as a first component of an adjustment element 38 which additionally comprises a control body 40 fastened to actuation element 32 wherein, via control body 40, a through-flow cross section between an inlet and an outlet of a flow housing (not shown in the drawings) can be cleared or blocked by lowering or lifting the control body 40 onto and off a valve seat surrounding the through-flow cross section.

According to the present invention, control body 40 comprises a first hollow body 42 and a second hollow body 44 which is arranged in the radial interior of the first hollow body 42. The first hollow body 42 comprises a cylindrical outer surface 46 which is closed along its circumference wherein, on the end of the cylindrical outer surface 46 facing away from actuation element 32, an annular plate 48 is formed that extends radially inward. An annular bulge 50 facing away from actuator 10 is additionally formed on annular plate 48. The opposite axial end 52 of the first hollow body 42 is entirely bent to the outside to avoid sharp edges on the side facing toward actuator 10. The first hollow body 42 is produced by deep-drawing from sheet metal.

The second hollow body 44 is likewise produced by deep-drawing from sheet metal and comprises a radially outer annular plate 54 from whose inner periphery an outer surface 56 extends into the inner region of the first hollow body 42 of which the annular plate 48 is arranged axially between the actuator 10 and the radially outer annular plate 54 of the second hollow body 44 and which by its annular bulge 50 rests on radially outer annular plate 54 and is circumferentially welded thereto. The radially outer region of the radially outer annular plate 54 of the second hollow body 44 has a sealing ring 58 molded thereto whose effective diameter for abutment on the valve seat corresponds to the diameter of the cylindrical outer surface 46 of the first hollow body 42. The outer surface 56 of the second hollow body 44 conically tapers in a first portion 60 that is axially followed by a first cylindrical portion 62 in which ten radial bores are formed, which serve as openings for pressure compensation. The first cylindrical portion 62 is followed by a radial constriction 66 from whose inner diameter a further cylindrical portion 68 extends in the direction of actuation element 32, the further cylindrical portion 68 having a smaller diameter than the first cylindrical portion 62. The further cylindrical portion 68 is slightly curved inward on its axial end.

The further cylindrical portion 68 as well as the radially inner part of constriction 66 have an elastomer 70 molded around them which extends beyond the further cylindrical portion 68 in the direction toward the actuation element 32 and which bears against actuation element 32.

Use is made of a connection element 72, which is produced by deep-drawing, to fasten the control body 40 to the actuation element 32. Connection element 72 is substantially pot-shaped, wherein a bottom 74 is arranged in a central circular recess 76 at the axial end of actuation element 32 and, on this site, is fastened by welding. The cylindrical portion 78 following bottom 74 extends on the second hollow body 44 up to the end of the elastomer 70 facing away from actuation element 32 and has an outer diameter that is smaller than the inner diameter of elastomer 70. This cylindrical portion 78 is followed, on the side opposite to bottom 74, by a radially widened portion 80 which radially extends substantially up to the radially outward end of elastomer 70 and whose outer diameter is thus larger than the inner diameter of the constriction 66 of the second hollow body 44. A space 82 that is formed during assembly of the adjustment element 38 and which extends axially between the constriction 66 of second hollow body 44 and the radially widened portion 80 of connection element 72 is correspondingly filled by the elastomer 70 which, when connection element 72 is welded to actuation element 32, is slightly compressed.

A chamber 84 is formed in housing 12 into which the control body 40 can be immersed upon actuation of the valve. Chamber 84 is radially delimited by a housing wall 86 wherein, at the end of housing wall 86 facing away from actuator 10, a ring-shaped plate 88 is formed whose inner diameter is slightly larger than the outer diameter of the first hollow body 44. A V-shaped seal 90 comprising two legs is supported on ring-shaped plate 88, wherein the first leg bears against the (circumferentially closed) cylindrical outer surface 46 of first hollow body 42, and the second leg bears against the radially limiting housing wall 86 so that, in the closed state of the valve, the chamber 84 is connected to the duct arranged thereunder exclusively via openings 64. One or a plurality of grooves are formed on the outer circumference of actuation element 32 to also supply a corresponding pressure to the central recess 30 between actuation element 32 and core 18 and thus to provide a pressure-compensated valve. A helical spring 94 is arranged in the interior of the first hollow body 42. To further provide that the control body 40 is positioned to rest on the valve seat in a non-powered condition of coil 14, helical spring 94 rests in a tensioned state against annular plate 48 of first hollow body 42 and, by its opposite axial end, bears against housing 12 of actuator 10.

Upon movement of the adjustment element 38 according to the present invention, the control body 40 is thus allowed to slightly tilt relative to the actuation element 32 so as to effect a safe closure. All movements will nonetheless continue to be damped by the elastomer 70 so that switching noises are avoided. The control body 40 can be connected to the actuation element 32 in a simple and durable way. It can also be produced in an inexpensive manner by deep-drawing sheet metal and is highly thermally resistant. The entire system is distinguished by high leak tightness, thereby providing for short opening and closing times.

It should be evident that the scope of protection of the present invention is not limited to the described exemplary embodiment. The adjustment element according to the present invention is also suitable for other actuators so that the actuation element does not necessarily have to be an armature of an electromagnet. Such an adjustment element can also be used to control the through-flow cross section of other liquid- or gas-conveying ducts. The shape of the control body can also be modified within the scope of protection of the main claim. Reference should also be had to the appended claims.

What is claimed is:

1. An adjustment element for a divert-air valve, the adjustment element comprising:
    an actuation element of an electromagnetic actuator, the actuation element being configured to be translatorily moved by the electromagnetic actuator;
    a control body configured to move with the actuation element, the control body comprising, a first hollow body comprising an outer surface which is circumferentially closed so as to define an interior, a first axial end, and an annular plate which is configured to extend radially inward from the first axial end, and a second hollow body comprising,
a radially outer annular plate which is configured to be sealingly fastened in an encircling manner axially to the annular plate of the first hollow body, the radially outer annular plate comprising a radially inner region, and
an outer surface which extends from the radially inner region of the radially outer annular plate in a direction of the actuation element in the interior of the first hollow body; and a connection element which is configured to fasten the control body to the actuation element.

2. The adjustment element as recited in claim 1, wherein the outer surface of the first hollow body is cylindrical.

3. The adjustment element as recited in claim 1, wherein the outer surface of the second hollow body comprises at least one opening arranged therein.

4. The adjustment element as recited in claim 1, wherein the control body is fixedly connected to the actuation element.

5. The adjustment element as recited in claim 4, wherein,
the connection element is fastened to the actuation element, the connection element being configured to extend into an interior of the second hollow body and comprising a radially widened portion on an end facing away from the actuation element, and
the second hollow body further comprises a radial constriction arranged axially between the actuation element and the radially widened portion of the connection element, the radial constriction being configured to correspond with the radially widened portion,
wherein,
an outer circumference of the radially widened portion of the connection element is larger than an inner circumference of the radial constriction of the second hollow body.

6. The adjustment element as recited in claim 5, wherein,
the actuation element further comprises a central recess arranged therein,
the connection element extends into and is fastened to the central recess on the actuation element, and a diameter of the central recess corresponds to an outer diameter of the connection element in a region where the connection element extends into the central recess.

7. The adjustment element as recited in claim 5, further comprising:
an elastomer arranged between the connection element and the second hollow body.

8. The adjustment element as recited in claim 7, wherein,
the radial constriction of the second hollow body and the radially widened portion of the connection element are arranged so as to provide a space located axially therebetween, and
the elastomer is configured to extend from the actuation element up to the radially widened portion of the connection element and to fill the space.

9. The adjustment element as recited in claim 5, wherein the second hollow body further comprises a plurality of openings distributed along a circumference thereof and arranged in a region between the radial constriction and the annular plate.

10. The adjustment element as recited in claim 5, wherein at least one of the first hollow body, the second hollow body, and the connection element are produced as a deep-drawn part from sheet metal.

11. The adjustment element as recited in claim 5, wherein at least one of
the first hollow body and the second hollow body are fastened to each other, and
the connection element is fastened to the actuation element,
via a welding, a bonding, a flanging or a crimping.

12. The adjustment element as recited in claim 1, further comprising:
a sealing ring fastened on a side of the annular plate of the second hollow body which is remote from the actuation element, the sealing ring comprising a diameter which corresponds to a largest diameter of the first hollow body.

13. The adjustment element as recited in claim 1, further comprising:
a spring arranged between the first hollow body and the second hollow body, the spring being configured so that, in an axially biased state, the spring bears onto the annular plate of the first hollow body.

* * * * *